United States Patent [19]

Francois et al.

[11] Patent Number: 4,565,650
[45] Date of Patent: Jan. 21, 1986

[54] PROCESS FOR N-DOPING OF POLYMERS

[75] Inventors: Bernard Francois, Strasbourg; Claude Mathis, Truchtersheim, both of France

[73] Assignee: Societe Nationale Elf Aquitaine, Courbevoie, France

[21] Appl. No.: 633,122

[22] Filed: Jul. 20, 1984

[30] Foreign Application Priority Data

Jul. 21, 1983 [FR] France ................ 83 12075

[51] Int. Cl.$^4$ .............. C08F 8/42; C08F 138/02; H01B 1/12; H01L 29/28
[52] U.S. Cl. .................... 252/518; 525/250; 525/275
[58] Field of Search ............. 252/518; 204/2.1, 131, 204/291; 525/250, 275

[56] References Cited

U.S. PATENT DOCUMENTS

| | | | |
|---|---|---|---|
| 4,204,216 | 5/1980 | Heeger | 357/8 |
| 4,321,114 | 3/1982 | MacDiarmid | 204/2.1 |
| 4,394,304 | 7/1983 | Wnek | 252/520 |
| 4,502,981 | 3/1985 | Delannoy | 252/512 |
| 4,517,116 | 5/1985 | Ivory | 252/500 |
| 4,519,939 | 5/1985 | Hocker | 252/500 |

FOREIGN PATENT DOCUMENTS 0054683  6/1982  European Pat. Off. .

Primary Examiner—Dennis L. Albrecht
Attorney, Agent, or Firm—Burgess, Ryan & Wayne

[57] ABSTRACT

A process for N doping polyacetylene or polyphenylene polymers by contacting the polymer with a doping agent selected from at least one composition selected from organolithium or the alkaline salts of carbanions or dicarbanions having a benzylic structure. The N doped polymers have electrochemical and photogalvanic applications.

The invention is a novel process for doping polyacetylene or polyphenylene and the products obtained by the process. The process provides N doped polymers that can be used in electrochemical or photovoltaic applications.

24 Claims, No Drawings

PROCESS FOR N-DOPING OF POLYMERS

BACKGROUND OF THE INVENTION

The doping of polymers to obtain semiconductor bodies is known. Either compounds that confer a positive charge (P doping) or compounds that confer a negative charge (N doping) to the polymers are used.

Numerous patents and publications describe the P doping of polymers by electron-acceptor compounds such as iodine or arsenic pentafluoride (Japanese Patent No. 81 145 929 deposited by Showa Denko), strong acids (Japanese Patent No. 80 129 425 of Showa Denko), or titanium salts (U.S. Pat. No. 4,349,664 of Japan Synthetic Rubber Co.).

N doping has not yet been extensively studied. A few publications refer to N doping by electrochemical means or by addition of electron-donor compounds to the polymers. As electron donors, alkali metals, alone, mixed or amalgamated, and alkali salts of radical-ions (European Patent 54683 of BASF) have been suggested.

Doping with alkali metals requires a metal/solid reaction which is difficult to control.

The synthesis of alkali salts of radical-ions such as sodium naphthalyde or the alkali metal complexes of aromatic ketones requires the presence of a polar solvent. If the metal used is sodium or lithium, the solvent also enters into the polymer and exerts a deleterious effect on the conductivity of the polymer. The insertion of the solvent into the polymer increases the weight of the polymer, which defeats some of the objectives sought in using them.

The invention provides a method for doping of polyacetylene and polyphenylene by a process that is simple and effective. The process makes it possible to obtain polymers with good conductivities both in polar and in non-polar solvents.

BRIEF SUMMARY OF THE INVENTION

According to the present invention, an N doped polyacetylene polymer or polyphenylene polymer is obtained by bringing into contact the polymer and a doping agent in a solvent for the doping agent characterized in that the doping agent is at least one composition selected from the group consisting of compounds of the formula.

(a) $R_1\text{-Li}$      (I)

wherein $R_1$ is an aryl radical, a saturated hydrocarbon radical an unsaturated hydrocarbon radical each of which can be a polymeric chain containing up to about 100,000 carbon atoms and (b) $\text{Ar}-\underset{R_2}{\overset{R_3}{\underset{|}{\overset{|}{C}}}}\ominus M^{\oplus}$      (II)

and wherein Ar is an aryl radical containing up to 3 rings which may be fused, a 2-pyridyl or 4-pyridyl radical, $R_2$ and $R_3$, are identical or different, and represent hydrogen, an aryl radical, a saturated hydrocarbon radical, an unsaturated hydrocarbon radical each of which can be a polymeric chain containing up to about 100,000 carbon atoms and M represents an alkali metal selected from Na, K, Li, Cs and Rb, and (c) $M^{\oplus}\ominus\underset{\text{Ar}}{\overset{R_4}{\underset{|}{\overset{|}{C}}}}-(R_6)-\underset{\text{Ar}}{\overset{R_5}{\underset{|}{\overset{|}{C}}}}\ominus M^{\oplus}$      (III)

wherein Ar and M are as defined above, $R_4$ and $R_5$ represent hydrogen, a saturated hydrocarbon radical, an unsaturated hydrocarbon radical, and aryl containing up to 3 rings which can be fused, $R_6$ is a saturated bivalent hydrocarbon radical or an unsaturated bivalent hydrocarbon radical each of which can be a polymeric chain containing up to about 100,000 carbon atoms.

The organolithium compounds of formula (I) can be used alone or in the presence of complexing agents such as N,N,N',N'-tetramethylene diamine (TMEDA) or cyclic ethers. The doping can be effected in the presence of non-polar aprotic solvents such as hexane or benzene. It is also possible to use polar solvents such as tetrahydrofuran. However, the stability of the organolithium compounds is not very high in polar solvents.

DETAILED DESCRIPTION OF THE INVENTION

The preferred organolithium compounds of formula (I) are alkyl and aryl lithium compounds and particularly suitable is primary, secondary or tertiary butyl lithium or phenyl lithium. Secondary butyl lithium and the complex thereof with TMEDA are particularly useful. Normal butyl lithium permits progressive and homogeneous doping at low doping levels.

The carbanionic or dicarbanionic salts of the formula (II) or (III) can be used in the presence of nonpolar solvents if the metal is lithium and with polar solvents if the salt is formed with other alkali metals.

Preferred among the carbanionic salts of formula (II) are compounds wherein Ar is a phenyl radical and $R_2$ and $R_3$ represent hydrogen, an alkyl radical containing from 1 to 6 carbon atoms or a phenyl radical. There can be cited benzyl lithium, 1,1-diphenyl hexyl lithium, 1,1-diphenyl-3,3-dimethyl butyl lithium, 1,1-diphenyl-3-methyl pentyl lithium, 1-phenyl-1-methyl-ethyl potassium or 1-phenyl-ethyl potassium. $R_2$ and $R_3$ can likewise represent a polystyrene or poly-alpha-methyl styrene chain containing up to about 10,000 styrene or alpha methyl styrene units in the chain.

Among the dicarbanionic compounds of formula (III), it is preferred to use the oligomers and "living polymers" of styrene or of alpha-methyl styrene, and the dimer of diphenyl-1,1-ethylene (tetraphenyl-1,1,4,4-methylene) associated with lithium, sodium or potassium.

The process according to the invention permits the doping of polymers such as polyacetylene or polyphenylene in a shaped form such as a film or as a powder.

The doping temperature can range from about −80° C. to +150° C., preferably from about 0° to 100° C. An increase in temperature accelerates the doping. The duration of doping can vary widely as for example between about 1 minute and 1 week. A doping period on the order of from about 10 minutes to 1 hour is often sufficient.

The invention and the main characteristics thereof will be better understood by reading the examples that follow which are presented as non-limiting illustrations.

EXAMPLES

The doping of polyacetylene films by different doping agents has been studied.

Polyacetylene is directly obtained in film form in the presence of a Ziegler-Natta catalyst (triethyl aluminum-titanium tetrabutylate) by using the SHIRAKAWA method (J. of Polym. Sci. 12 11 (1974)). Samples of about $3 \times 1 \times 0.02$ cm clipped from this film are tightened between copper jaws which are connected to airtight outputs in a glass apparatus including a tube of dopant closed by a break seal. The apparatus is then sealed under vacuum and the doping tube is opened by means of a magnet previously introduced into the apparatus and driven by an external magnet. The conductivity is measured as a function of the period of doping. In order to take into consideration the porous nature of polyacetylene films and the variation of their apparent density depending on the preparation process, there is first calculated a net conductivity ($C_B$) related to the actual dimension and then a normalized conductivity ($C_N$) that corresponds to the conductivity of the same compacted film and which is given by the formula:

$$C_N = \frac{C_B \times 1.16}{d}$$

wherein d corresponds to the apparent density of the undoped film and 1.16 is the density of the polyacetylene in a mass.

Table 1 sets forth the results obtained with the organolithium compounds of formula (I) in the presence of aprotic and apolar solvents. All the compounds studied allow important rates of doping in this medium. The secondary butyl lithium is much more reactive than the normal isomer. The speed of the reaction is further increased by the addition of a complexing agent, N,N,N',N'-tetramethylenediamine (TMEDA) and by elevation of the temperature.

TABLE 1

| Dopant Concentration mol/l | n-Eu Li 1,55 | | n-Bu Li/IMEDA 1,2 | | sec-Bu Li 1,0 | | sec-Bu Li 1,4 | | sec-Bu Li 1,4 | | sec-Bu Li/IMEDA saturated solution | |
|---|---|---|---|---|---|---|---|---|---|---|---|---|
| Solvent Temperature | Hexane 20° C. | | Hexane 20° C. | | Benzene 20° C. | | Cyclohexane 20° C. | | Cyclohexane 80° C. | | Cyclohexane 20° C. | |
| | time | C.N. | time | C.N. | time | C.N. | time | C.N. | time | C.N. | time | C.N. |
| | 10 min. | $4,4.10^{-8}$ | 10 min. | $5,3.10^{-4}$ | 10 min. | $6,3.10^{-2}$ | 10 min. | $4,6.10^{-2}$ | 2 min. | 1,6 | 1 min. | $4.10^{-2}$ |
| | 1 day | $1,5.10^{-3}$ | 1 hour | $5,4.10^{-3}$ | 1 hour | 4,3 | 1 hour | 4,0 | 5 min. | 11,0 | 5 min. | 0,35 |
| | 2 days | $4,4.10^{-2}$ | 10 h. | 0,46 | 5 hours | 61 | 5 hours | 44,2 | 10 min. | 28,5 | 10 min. | 1,0 |
| | 6 days | 1,5 | 20 h. | 2,4 | 10 hours | 89 | 10 hours | 77,0 | 1 hour | 99 | 1 hour | 14,5 |
| | 50 days | 26 | 2 days | 18,6 | 30 hours | 116 | 30 hours | 123 | | | 5 hours | 70 |
| | | | 6 days | 49 | | | 4 days | 144 | | | 10 hours | 78,6 |
| | | | | | | | | | | | 1 day | 87,7 |
| Rate of doping* Y | 50 days | Y = 0,15 | | | 30 h. | Y = 0,20 | 4 days | Y = 0,19 | | | 1 day | Y = 0,23 |

*obtained by chemical dosing of the constituents and is expressed in gram atoms of metal per C and H $$Y = \frac{[M]}{[CH]}$$

C.N.: Normalized conductivity in ohm$^{-1}$ cm$^{-1}$

Table 2 presents the results obtained using carbanionic and dicarbanionic salts. Diphenyl hexyl lithium gives comparable results in a non-polar solvent such as cyclohexane and in a solvent of low polarity such as diethyl ether. On the other hand, the dicarbanionic dimer of 1,1-diphenyl-ethylene associated with lithium used in tetrahydrofuran confers low conductivity on polyacetylene due to the simultaneous insertion of the solvent. After drying for 24 hours under high vacuum, the conductivity is increased by 20 times.

TABLE 2

| Dopant Concentration mol/l | Diphenylhexyl-Li saturated solution | | Diphenylhexyl-Li saturated solution | | Diphenylhexyl-Li $5.10^{-1}$ | | DD=(Li$^+$)$_2$[1] $2.10^{-1}$ | |
|---|---|---|---|---|---|---|---|---|
| Solvent Temperature | Cyclohexane 20° C. | | Cyclohexane 70° C. | | Diethylether 20° C. | | THF 20° C. | |
| | time | C.N. | time | C.N. | time | C.N. | time | C.N. |
| | 1 min. | 0,56 | 1 min. | 17,5 | 1 min. | 0,32 | 5 min. | 5,6 |
| | 5 min. | 3,6 | 5 min. | 73,5 | 10 min. | 3,5 | 10 min. | 9,2 |
| | 30 min. | 25,7 | 10 min. | 100 | 30 min. | 32 | 30 min. | 16 |
| | 1 hour | 52,7 | 1 hour | 148 | 1 hour | 73,3 | 1 hour | 18 |
| | 10 hour | 129 | | | 10 hour | 173 | 2 hour | 20[2] |
| | 2 days | 167 | | | | | | |
| Rate of doping | 2 days | Y = 0,24 | 1 hour | — | 10 hours | Y = 0,20 | 2 hour | Y = 0,15 |

[1]DD=(Li$^+$)$_2$ dicarbanionic dimer of 1,1-diphenyl ethylene associated with lithium
[2]After drying under high vacuum for 24 hours, the normalized conductivity reaches 420 ohm$^{-1}$ cm$^{-1}$.
C.N.: Normalized conductivity in ohm$^{-1}$ cm$^{-1}$ Table 3 shows the results obtained with sodium and potassium monocarbanionic and dicarbanionic salts in a polar solvent, tetrahydrofuran. The sodium salts are very sensitive to the presence of the solvent. The conductivity increases very substantially after drying under vacuum. On the other hand, the potassium carbanionic salts give elevated conductivities even in the presence of a solvent.

TABLE 3

| Dopant | DD⁼(Na⁺)₂ | | DD⁼(K⁺)₂ | | DD⁼(K⁺)₂ | | DD⁼(K⁺)₂ | | (αMeS)₂₋₄⁼(K⁺)₂ | | Phenyl-1 ethyl-K | |
|---|---|---|---|---|---|---|---|---|---|---|---|---|
| Concentration mol/l | $2.10^{-1}$ | | $1.10^{-2}$ | | $5.10^{-2}$ | | $2.10^{-1}$ | | $1.10^{-1}$ | | $1.10^{-2}$ | |
| Solvent | THF | | THF | | THF | | THF | | THF | | THF | |
| Temperature | 20° C. | | 20° C. | | 20° C. | | 20° C. | | 20° C. | | 20° C. | |
| | time | C.N. | time | C.N. | time | C.N. | time | C.N. | time | C.N. | time | C.N. |
| | 1 min. | 1,0 | 30 min. | 0,53 | 1 min. | 0,29 | 1 min. | 0,93 | 1 min. | 0,73 | 5 min. | 0,056 |
| | 5 min. | 2,5 | 1 hour | 2,32 | 5 min. | 3,08 | 5 min. | 5,3 | 5 min. | 6,14 | 30 min. | 1,28 |
| | 30 min. | 8,7 | 5 hour | 28,4 | 10 min. | 7,6 | 10 min. | 11,7 | 10 min. | 13,0 | 1 hour | 3,85 |
| | 1 hour | 13,8 | 10 hour | 75,4 | 30 min. | 33,5 | 30 min. | 40,6 | 30 min. | 41,5 | 5 hour | 47 |
| | 1 day | 55,7⁽¹⁾ | 20 hour | 170 | 1 hour | 71,5 | 1 hour | 84 | 1 hour | 85,3 | 10 hour | 88 |
| | | | 2 days | 312 | 5 hour | 290 | | | 5 hour | 210 | 1 day | 157 |
| | | | 5 days | 460 | 10 hour | 350 | | | 1 day | 263 | 5 day | 240 |
| | | | | | 2 days | 439 | | | | | | |
| | | | | | 4 days | 503 | | | | | | |
| Rate of Doping Y | 1 day | Y = 0,16 | 5 days | Y = 0,18 | 4 days | Y = 0,20 | | | 1 day | Y = 0,20 | 5 days | Y = 0,15 |

C.N.: Normalized conductivity in $ohm^{-1} cm^{-1}$
DD⁼: dicarbanionic dimer of 1,1-diphenyl ethylene
alphaMeS: alpha-methyl styrene.
⁽¹⁾After drying under high vacuum for 1 hour the normalized conductivity reaches 160 $ohm^{-1} cm^{-1}$.

We claim:

1. A process for the production of N doped polyacetylene and polyphenylene which comprises:
    contacting the polymer with a doping agent, in a solvent for the doping agent, wherein the doping agent is selected from the group consisting of compounds of formula (a) $R_1$-Li  (I)

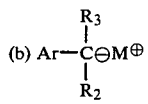

wherein $R_1$ is an aryl radical, a saturated hydrocarbon radical, an unsaturated hydrocarbon radical, each of which can be a polymeric chain containing up to about 100,000 carbon atoms;

(b) $Ar\text{---}\underset{R_2}{\overset{R_3}{\underset{|}{\overset{|}{C}}}}\ominus M^\oplus$  (II)

wherein Ar is an aryl radical containing up to about 3 rings which can be fused, a 2-pyridyl or a 4-pyridyl radical, $R_2$ and $R_3$ are identical or different and represent hydrogen, an aryl radical, a saturated hydrocarbon radical, an unsaturated hydrocarbon radical, each of which can be a polymeric chain containing up to about 100,000 carbon atoms and M represents an alkali metal atom selected from Na, K, Li, Cs and Rb; and (c) $M^\oplus\ominus\underset{Ar}{\overset{R_4}{\underset{|}{\overset{|}{C}}}}\text{---}(R_6)\text{---}\underset{Ar}{\overset{R_5}{\underset{|}{\overset{|}{C}}}}\ominus M^\oplus$  (III)

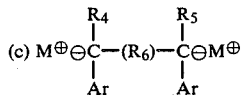

wherein Ar and M are as defined above, $R_4$ and $R_5$ independently represent hydrogen, a saturated hydrocarbon radical, an unsaturated hydrocarbon radical and an aryl containing up to about 3 rings which can be fused, $R_6$ represents a saturated or unsaturated bivalent hydrocarbon radical each of which can be a polymeric chain containing up to about 100,000 carbon atoms.

2. A process according to claim 1, wherein the doping agent is a compound of formula (I) wherein $R_1$ is an alkyl group of from 1 to 12 carbon atoms or a phenyl group.

3. A process according to claim 2, wherein the doping agent comprises at least one member selected from the group consisting of a primary, secondary and tertiary butyl lithium.

4. A process of claim 3, wherein the doping agent comprises a secondary butyl lithium.

5. A process according to claim 1, wherein the doping agent is admixed with a complexing agent.

6. A process according to claim 5, wherein the complexing agent is tetramethylene diamine.

7. A process according to claim 1, wherein the doping agent is a compound of formula (II) wherein Ar is phenyl and $R_1$ and $R_2$ independently represent hydrogen, an alkyl radical containing from 1 to about 6 carbon atoms, or a phenyl radical.

8. A process according to claim 7, wherein the doping agent is at least one compound selected from the group consisting of benzyl lithium, 1,1-diphenyl hexyl lithium, 1,1-diphenyl 3,3-dimethyl butyl lithium, 1,1-diphenyl 3-methyl-pentyl lithium and polystyryl lithium.

9. A process according to claim 7, wherein the doping agent is at least one compound selected from the group consisting of 1-phenylethyl potassium and cesium, 1-phenyl-1-methyl ethyl potassium and cesium, polystyryl potassium and polystyryl cesium.

10. A process according to claim 1, wherein the doping agent comprises at least one compound selected from the group consisting of α,ω-di-carbanionic oligomers of styrene or α-methyl styrene, dicarbanionic dimers of 1,1-diphenyl ethylene, and α,ω-dicarbanionic polymers of styrene and α-methyl styrene.

11. The process of claim 3 or 8, wherein a non-polar solvent is used.

12. A process according to claim 1, wherein a polar solvent is used.

13. A process according to claim 7, 8, 9 or 10 wherein a polar solvent is used.

14. A process according to claim 1, 2, 3, 7, 8, 9 or 10 wherein the doping is carried out at a temperature between about −80° C. and +150° C.

15. A process according to claim 1, 2, 3, 6, 7, 8, 9 or 10 wherein the doping is carried out for a period ranging from about 1 minute to about 1 week.

16. The method of claim 11 wherein the non-polar solvent comprises at least one solvent selected from the group consisting of hexane, cyclohexane and benzene.

17. The method of claim 12 wherein the polar solvent is tetrahydrofuran.

18. An N-doped polymer comprising polyacetylene or polyphenylene and an N-doping effective amount of a dopand comprising at least one compound selected from the group consisting of compounds of the formula (a) $R_1\text{-Li}$  (I)

wherein $R_1$ is an aryl radical, a saturated hydrocarbon radical, an unsaturated hydrocarbon radical, each of which can be a polymeric chain containing up to about 100,000 carbon atoms;

(b) 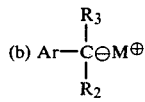  (II)

wherein Ar is an aryl radical containing up to 3 rings, which can be fused, a 2-pyridyl or a 4-pyridyl radical, $R_2$ and $R_3$, are identical or different and represent hydrogen, an aryl radical, a saturated hydrocarbon radical, an unsaturated hydrocarbon radical, each of which can be a polymeric chain containing up to about 100,000 carbon atoms and M represents an alkali metal atom selected from Na, K, Li, Cs and Rb; and (c) 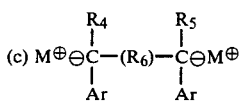  (III)

wherein Ar and M are as defined above, $R_4$ and $R_5$ independently represent hydrogen, a saturated hydrocarbon radical, an unsaturated hydrocarbon radical and an aryl containing up to about 3 rings which can be fused, $R_6$ represents a saturated or unsaturated bivalent hydrocarbon radical each of which can be a polymeric chain containing up to about 100,000 carbon atoms wherein $R_1$, $R_2$, $R_3$, $R_4$, $R_5$, $R_6$, and M are as defined above.

19. The N-doped polymer of claim 18 wherein the doping agent comprises at least one member selected from the group consisting of primary butyl lithium, secondary butyl lithium and tertiary butyl lithium.

20. An N-doped polymer of claim 19, wherein the doping agent comprises secondary butyl lithium.

21. The N-doped polymer of claim 18 wherein the doping agent comprises an N-doping effective amount of a compound of formula (II) wherein Ar is phenyl, and $R_1$ and $R_2$ independently represent hydrogen, an alkyl radical containing up to about 6 carbon atoms or phenyl.

22. The N-doped polymer of claim 18 wherein the doping agent comprises an N-doping effective amount of at least one compound selected from the group consisting of benzyl lithium, 1,1-diphenyl hexyl lithium, 1,1-diphenyl, 3,3-dimethyl butyl lithium, 1,1-diphenyl 3-methyl-pentyl lithium and polystyryl lithium.

23. The N-doped polymer of claim 18 wherein the doping agent comprises an N-doping effective amount of at least one compound selected from the group consisting of 1-phenyl-ethyl potassium and cesium, 1-phenyl-1-methyl ethyl cesium, and potassium polystyryl potassium and polystyryl cesium.

24. The N-doped polymer of claim 18 wherein the doping agent comprises an N-doping effective amount of at least one compound selected from the group consisting of α,ω-dicarbanionic oligomers of styrene or α-methyl styrene, dicarbanionic dimers of 1,1-diphenyl ethylene and α,ω-dicarbanionic polymers of styrene and α-methyl styrene.

* * * * *